J. S. CLINTON.
APPARATUS FOR DEPOSITING DOUGH.
APPLICATION FILED NOV. 5, 1915.
1,301,038.
Patented Apr. 15, 1919.
2 SHEETS—SHEET 1.
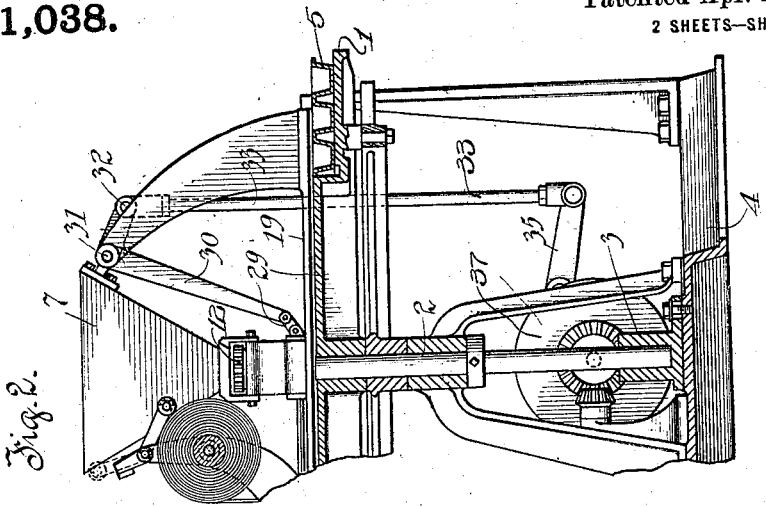
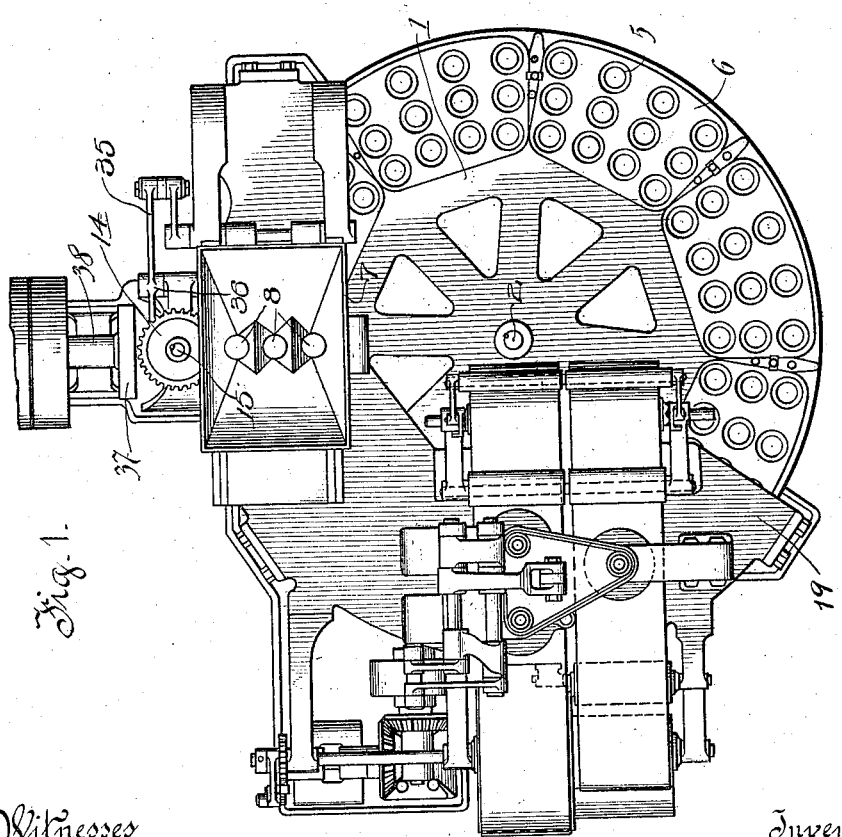

J. S. CLINTON.
APPARATUS FOR DEPOSITING DOUGH.
APPLICATION FILED NOV. 5, 1915.
1,301,038.
Patented Apr. 15, 1919.
2 SHEETS—SHEET 2.
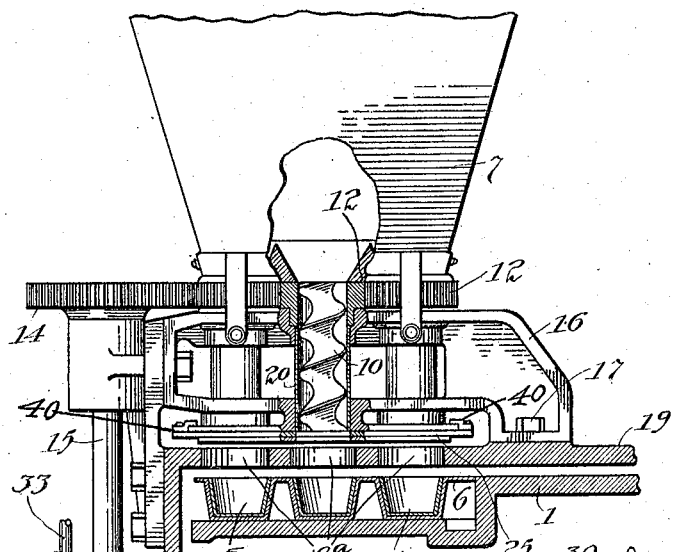
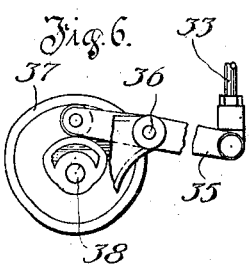
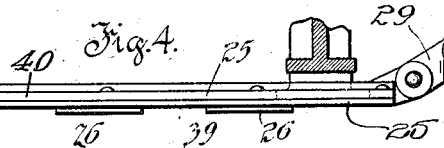
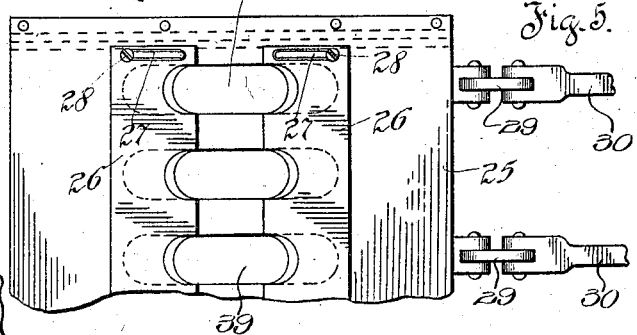
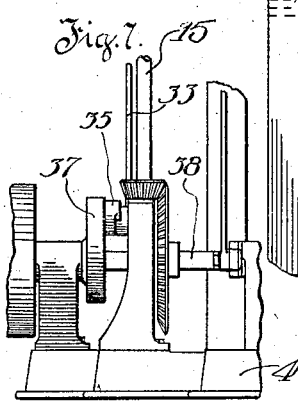

UNITED STATES PATENT OFFICE.

JAMES S. CLINTON, OF CHICAGO, ILLINOIS.

APPARATUS FOR DEPOSITING DOUGH.

1,301,038.      Specification of Letters Patent.      Patented Apr. 15, 1919.

Original application filed June 13, 1912, Serial No. 703,442. Divided and this application filed November 5, 1915. Serial No. 59,814.

*To all whom it may concern:*

Be it known that I, JAMES S. CLINTON, a citizen of the United States, residing at Chicago, in the county of Cook and State of Illinois, have invented a certain new and useful Improvement in Apparatus for Depositing Dough, of which the following is a full, clear, concise, and exact description, reference being had to the accompanying drawings, forming a part of this specification.

My invention relates to apparatus for depositing dough, as for example in machines for making various bakery articles, such as cup cakes and the like.

Prominent objects of the invention are to provide a simple and practical mechanism for depositing dough; to simplify and cheapen the cost of the same; to arrange to adjust the amount of dough deposited properly; and to secure the foregoing and other desirable results in a simple and expeditious manner.

In the accompanying drawings I show a dough depositing mechanism especially adapted for use in connection with a machine for making cup cakes or the like, which machine is fully set forth in my application, Serial No. 703,442, filed June 13, 1912, Patent No. 1,162,751, December 7, 1915. Therefore this application is a division of my aforesaid application. It will be understood, however, that the mechanism of the present application may be applied in other ways to other machines and for other purposes.

In the accompanying drawings Figure 1 is a plan view of the cup cake machine referred to in my said other application, and having the dough feeding mechanism forming the subject matter of the present application disclosed therein;

Fig. 2 is a vertical section of a portion of said machine showing the dough feeding mechanism particularly;

Fig. 3 is an elevation and partial section of the feeding mechanism more in detail; and Figs. 4, 5, 6, and 7 are views of details of construction.

Referring first to Figs. 1 and 2, the machine illustrated has a rotary table 1 mounted on a vertically arranged shaft 2, which is supported in a bearing 3 mounted on the base 4. The table 1 is intended to carry a series of tins 5 for cup cakes or other articles, and to such end as a convenient arrangement the tins 5 are arranged in radial rows and mounted upon removable plates or dishes 6—6. Above the table 1 is shown a hopper 7 having three apertures 8—8 in its bottom, which said apertures 8—8 are located so as to be in position above the three tins 5—5 forming one of the radial rows of tins on the table 1, as shown in Fig. 3. Within the apertures 8—8 are located rotary screws 10. These screws are to feed the dough or other material downwardly from the hopper 7 into the tins 5. As an arrangement for rotating these screws 10 each one is provided with a gear 12 at its upper end, which said gears are arranged to intermesh. Said gears 12 are driven by another gear 14 mounted on a rotary shaft 15 which extends down and is gear connected with a rotary driving shaft 38, Fig. 2. The gears 12 are conveniently mounted on a bridge-like bracket 16 which is secured as by bolts 17 upon a member 19 forming a part of the frame of the machine and located above the table, the member 19 comprising a flat plate-like structure covering a portion of the table 1 as shown in Fig. 1. Sleeves 20 surround the feed screws 10, being also supported by the bracket 16. A cut-off arrangement is preferably provided to shut off the material being fed down through the sleeves 20. To such end I provide a slidable or shifting plate 25 located between the member 19 and the lower ends of the tubular members 20. This plate 25 is provided with elongated openings 39 adapted to register with the lower ends of the tubes 20. Strips 40 are secured, as by rivets, to the sides of this plate 25 and these strips 40 engage the edges of a bridge piece located immediately above said plate 25, whereby said plate 25 may have a slidable or shifting movement. Two cutters or cutting members 26 are combined with the plate 25, being located underneath said plate 25, as shown in Figs. 4 and 5. These cut-off members 26 have a sliding connection with the member 25, as by slots 27 and screws 28, so that an adjustment of the members 26 relatively to the plate 25 and the elongated openings 39 may be made, to adjust the amount of dough to be delivered to the tins 5. Means are provided by which the member 25 is shifted from right to left, referring to Figs. 2, 4 and 5, a simple arrangement being to provide a link connection 29 with a bell crank 30 pivoted at 31 on the hopper 7, as shown in Fig. 2. The bell crank 30 is also pivotally connected at 32 with a vertically reciprocating rod 33 which extends down and is connected with the arm 35 pivotally mounted at 36, (Fig. 1), and arranged to be operated by a cam 37 on the shaft 38, Figs. 6 and 7. Thus the operation of the arm 35 causes a vertical reciprocation on the part of the rod 33, and that in turn causes a horizontal movement of the plate 25, first one way and then another, and these movements are timed in order to effect a proper feeding by opening and closing the lower ends of the feed tubes 20. The movements are so timed as to keep the dough openings opened a proper length of time to permit sufficient dough to be fed into the tins 5—5 to fill the same to the extent desired, the member 19 being provided with apertures 19$^a$ to permit the dough to pass from the tubes 20 into the tins 5.

It will be understood that changes and modifications may be made without departing from the spirit of the invention.

What I claim is:

1. In a cup cake machine in combination, a movable support, baking tins carried by said support, a fixed plate beneath which said support moves, said plate being provided with apertures, a bridge piece mounted above said apertures, a hopper for dough carried above said bridge piece, and feeding worms carried by said bridge piece for delivering dough from said hopper into said tins, the axes of said feed worms being arranged in alinement with said tins.

2. In a cup cake machine in combination, a hopper for receiving dough, feeding mechanism for delivering dough from said hopper, a cut-off plate coöperating with said feeding mechanism for determining the amount of dough delivered by said mechanism, said plate being provided with an elongated slot, and a cutting knife having an adjustable connection with said plate.

3. In a cup cake machine in combination, a revoluble table, a fixed plate covering a portion of said table, a bridge piece mounted above said plate, a hopper supported by said bridge piece, a plurality of feeding worms passing through tubes suspended in said bridge piece for delivering dough from said hopper, and a reciprocating cut-off plate operating in front of the lower ends of said tubes, said plate being provided with a plurality of elongated apertures, and having guide strips attached to its upper face, said bridge piece having guides depending from its lower portion for coöperating with said guide strips to suspend said plate.

4. In a cup cake machine in combination, a hopper for receiving dough and feeding mechanism for delivering dough from said hopper, a cut-off plate coöperating with said feeding mechanism for determining the amount of dough delivered by said mechanism, said plate being provided with an elongated slot and a pair of knives carried by said plate one at each end of said slot.

5. Apparatus of the class specified comprising a hopper, openings in the bottom thereof, feed devices for said openings, means for operating said feed devices, and cut-off mechanism comprising a sliding member provided with adjustable cut-off members.

In witness whereof, I hereunto subscribe my name this 18th day of March, A. D. 1914.

JAMES S. CLINTON.

Witnesses:
A. L. Jones,
Hazel A. Jones.

Copies of this patent may be obtained for five cents each, by addressing the "Commissioner of Patents, Washington, D. C."